United States Patent
Ogawa

(10) Patent No.: US 8,260,041 B2
(45) Date of Patent: Sep. 4, 2012

(54) IMAGE-CAPTURING APPARATUS AND METHOD, EXPRESSION EVALUATION APPARATUS, AND PROGRAM

(75) Inventor: Kaname Ogawa, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 13/109,463

(22) Filed: May 17, 2011

(65) Prior Publication Data

US 2011/0216218 A1 Sep. 8, 2011

Related U.S. Application Data

(62) Division of application No. 11/881,989, filed on Jul. 30, 2007.

(30) Foreign Application Priority Data

Aug. 2, 2006 (JP) ................................ P2006-211000

(51) Int. Cl.
- *G06K 9/62* (2006.01)
- *G06K 9/00* (2006.01)
- *G06K 9/46* (2006.01)
- *G06K 9/66* (2006.01)
- *G06K 9/20* (2006.01)
- *G06K 9/60* (2006.01)

(52) U.S. Cl. ........ 382/159; 382/118; 382/103; 382/124; 382/190; 382/283; 382/224; 382/225; 382/305

(58) Field of Classification Search .................... None
See application file for complete search history.

(56) References Cited

U.S. PATENT DOCUMENTS

| 5,659,624 | A | 8/1997 | Fazzari et al. | |
|---|---|---|---|---|
| 6,684,130 | B2* | 1/2004 | Ogure et al. | 700/245 |
| 7,203,346 | B2 | 4/2007 | Kim et al. | |
| 7,652,695 | B2* | 1/2010 | Halpern | 348/239 |
| 7,667,736 | B2 | 2/2010 | Cazier | |
| 7,734,087 | B2 | 6/2010 | Hwang et al. | |
| 7,856,171 | B2 | 12/2010 | Bang et al. | |
| 2005/0141063 | A1* | 6/2005 | Nishino et al. | 358/527 |

(Continued)

FOREIGN PATENT DOCUMENTS

EP 1650711 A1 4/2006

(Continued)

OTHER PUBLICATIONS

Office Action from Chinese Application No. CN 200710138044.0, dated Feb. 12, 2010.

*Primary Examiner* — Tom Y Lu
*Assistant Examiner* — Thomas Conway
(74) *Attorney, Agent, or Firm* — Lerner, David, Littenberg, Krumholz & Mentlik, LLP

(57) ABSTRACT

An image-capturing apparatus for capturing an image by using a solid-state image-capturing device may include a face detector configured to detect a face of a human being on the basis of an image signal in a period until an image signal obtained by image capturing is recorded on a recording medium; an expression evaluation section configured to evaluate the expression of the detected face and to compute an expression evaluation value indicating the degree to which the detected face is close to a specific expression in relation to expressions other than the specific expression; and a notification section configured to notify notification information corresponding to the computed expression evaluation value to an image-captured person.

13 Claims, 14 Drawing Sheets

U.S. PATENT DOCUMENTS

| | | |
|---|---|---|
| 2005/0201594 A1 | 9/2005 | Mori et al. |
| 2005/0201595 A1 | 9/2005 | Kamei |
| 2005/0280809 A1 | 12/2005 | Hidai et al. |
| 2006/0110014 A1 | 5/2006 | Philomin et al. |
| 2006/0115157 A1* | 6/2006 | Mori et al. .................... 382/190 |
| 2007/0025722 A1* | 2/2007 | Matsugu et al. .............. 396/263 |

FOREIGN PATENT DOCUMENTS

| | | |
|---|---|---|
| JP | 2003-219218 A | 7/2003 |
| JP | 2004-046591 A | 2/2004 |
| JP | 2004-294498 A | 10/2004 |
| JP | 2005-157679 A | 6/2005 |
| JP | 4197019 B2 | 10/2008 |

* cited by examiner

FIG. 3
[S1] FACE DETECTION PROCESS IS PERFORMED
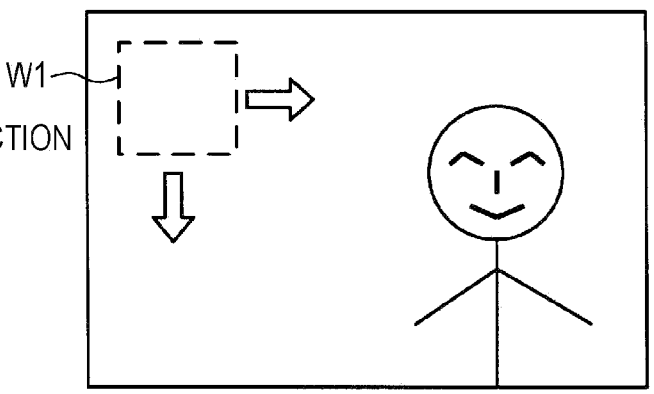
[S2] DETECTED FACE REGION IS EXTRACTED
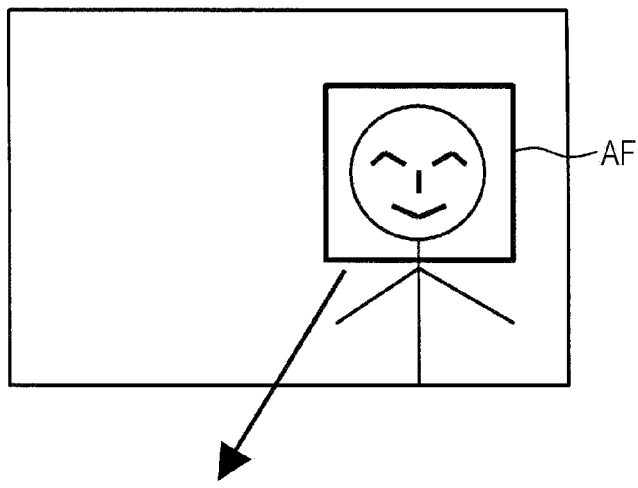
[S3] SIZE OF FACE IS NORMALIZED
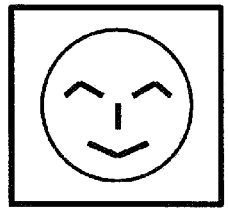 (ex: 48 × 48 PIXELS)
[S4] DEGREE OF EXPRESSION IS EVALUATED, AND "EXPRESSION EVALUATION VALUE" IS CALCULATED
[S5] INFORMATION CORRESPONDING TO EXPRESSION EVALUATION VALUE IS NOTIFIED TO IMAGE-CAPTURED PERSON
SMILE SCORE

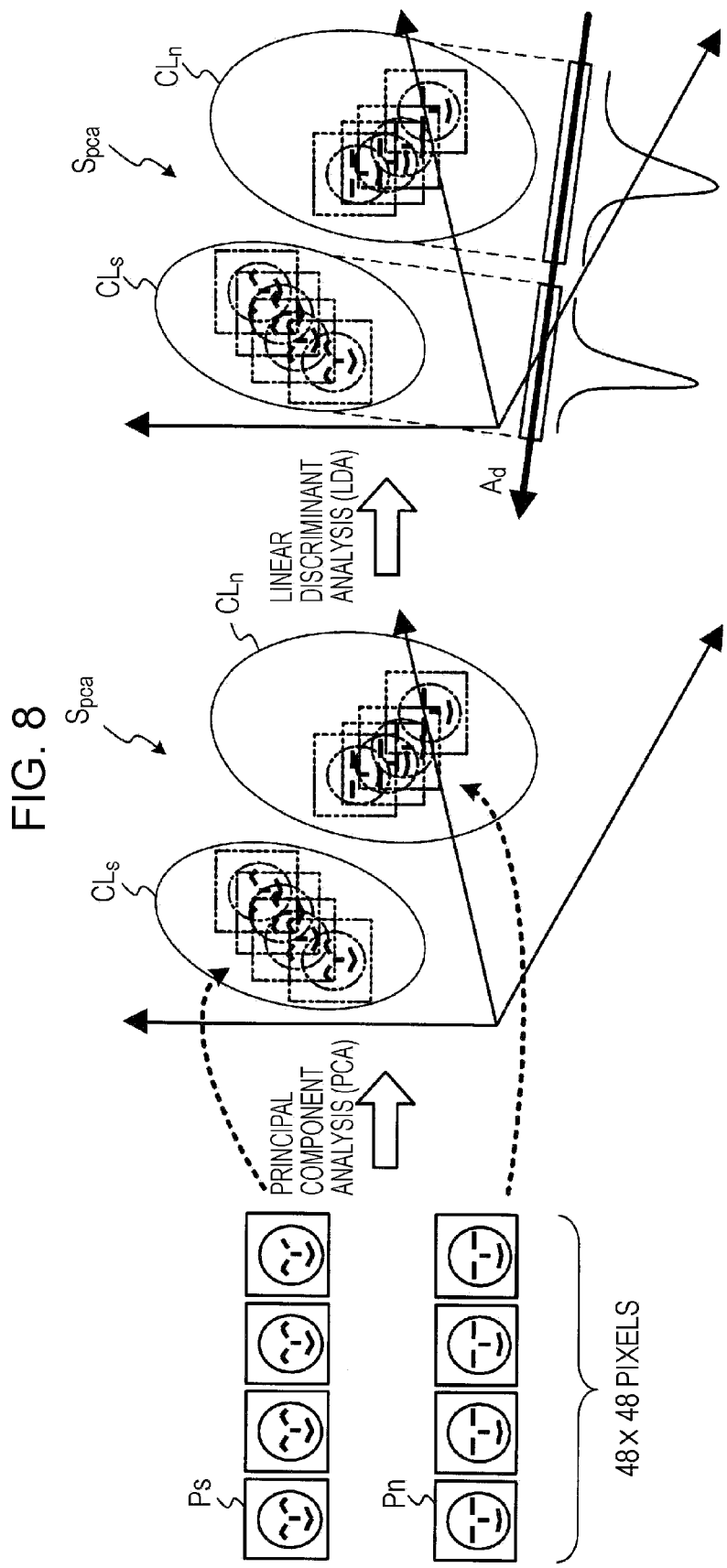

IMAGE-CAPTURING APPARATUS AND METHOD, EXPRESSION EVALUATION APPARATUS, AND PROGRAM

CROSS-REFERENCE TO RELATED APPLICATIONS

This application is a divisional of U.S. application Ser. No. 11/881,989, filed on Jul. 30, 2007, which claims priority from Japanese Patent Application No. JP 2006-211000 filed in the Japanese Patent Office on Aug. 2, 2006, the entire content of which is incorporated herein by reference.

BACKGROUND OF THE INVENTION

1. Field of the Invention

The present invention relates to an image-capturing apparatus and method for capturing an image by using a solid-state image-capturing device, to an expression evaluation apparatus for evaluating the expression of an image-captured face, and to a program for performing the processing thereof.

2. Description of the Related Art

In image-capturing apparatuses, a so-called self-timer function of automatically releasing a shutter button after a fixed period of time has elapsed from when an operation for depressing the shutter is performed is typically installed in not only silver-halide cameras, but also digital still cameras. However, the timing at which a shutter is released by the self-timer function is determined in advance. Therefore, it is difficult to guarantee that a person being image-captured has a desired expression on their face at the time the shutter is released, and there is a problem in that unsatisfactory photographs may be often taken.

On the other hand, in recent years, image processing technologies for performing digital computation processing on the basis of an image signal have progressed rapidly, and as an example thereof, a technology for detecting the face of a human being from an image is known. There is a known face detection technology in which, for example, a difference in luminance between two pixels in a face image is learnt as an amount of a feature, an estimated value indicating whether or not a predetermined region in an input image is to be computed on the basis of the feature amount, and whether or not the image in the region is a face is finally determined on the basis of the estimated value of one or more estimated values (refer to, for example, Japanese Unexamined Patent Application Publication No. 2005-157679 (Paragraph Nos. [0040] to [0052], FIG. 1).

The development of such face detection technologies has progressed to a level at which such a technology can be installed into a digital image-capturing apparatus for performing image capturing using a solid-state image-capturing device, such as a digital still camera. Recently, furthermore, a technology for determining the expression of a detected face has attracted attention. It has been considered that, for example, the expression of a face of an image-captured person could be evaluated for each captured image from the image signal in which a plurality of frames are continuously captured, so that an appropriate image can be selected on the basis of the information on those evaluations (refer to, for example, Japanese Unexamined Patent Application Publication No. 2004-46591 (Paragraph Nos. [0063] to [0071], FIG. 3).

BRIEF SUMMARY OF THE INVENTION

In recent years, since competition among makers of digital image-capturing apparatuses has become intensified, there has been a strong demand for advancement of such image-capturing apparatuses in order to increase the product value thereof. As in the problem of the above-described self-timer function, a captured image is not necessarily satisfactory to an image-capturing person and an image-captured person. Therefore, it may be said that a function of assisting an image-capturing operation in order to increase such a degree of satisfaction is very important for increasing the product value. It has been desired that, in particular, such a function be implemented using an advanced image processing technology. However, a function of assisting an image-capturing operation in real time while such an image-capturing operation is being performed has yet to be implemented.

The present invention has been made in view of such problems. It may be desirable to provide an image-capturing apparatus and method capable of capturing an image with high satisfaction for an image-captured person and an image-capturing person.

It may also be desirable to provide an expression evaluation apparatus capable of capturing an image with high satisfaction for an image-captured person or an image-capturing person, and a program for performing the processing thereof.

According to an embodiment of the present invention, there is provided an image-capturing apparatus for capturing an image by using a solid-state image-capturing device, the image-capturing apparatus may include a face detector configured to detect a face of a human being on the basis of an image signal in a period until an image signal obtained by image capturing is recorded on a recording medium; an expression evaluation section configured to evaluate the expression of the detected face and to compute an expression evaluation value indicating the degree to which the detected face is close to a specific expression in relation to expressions other than the specific expression; and a notification section configured to notify notification information corresponding to the computed expression evaluation value to an image-captured person.

In such an image-capturing apparatus, in a period of time until an image signal obtained by image capturing is recorded on a recording medium, the face detector may detect the face of a person from the image signal. The expression evaluation section may evaluate the expression of the face detected by the face detector, and compute an expression evaluation value indicating how close the face expression is to a specific expression in relation to expressions other than the specific expression. The notification section may notify the image-captured person of notification information corresponding to the computed expression evaluation value.

In the image-capturing apparatus of the present invention, in a period of time until a captured image signal obtained in image capturing is recorded on a recording medium, a face of a person may be detected from the captured image, the expression of the face may be evaluated, and an expression evaluation value indicating the degree to which the specific expression is close to a specific expression in relation to expressions other than the specific expression may be computed. Then, notification information corresponding to the expression evaluation value may be notified or supplied to the image-captured person. Therefore, it is possible to allow the image-captured person to recognize whether the expression of himself/herself is appropriate for image capturing, and as a result, it is possible to prompt the image-captured person to form a better expression. Therefore, it becomes possible to reliably record an image with high satisfaction for an image-captured person and an image-capturing person on a recording medium.

BRIEF DESCRIPTION OF THE DRAWINGS

FIG. 3 shows the outline of operations in the expression evaluation mode;

FIG. 8 conceptually shows information to be generated in advance for the purpose of expression evaluation, and the flow of information generation;

DETAILED DESCRIPTION

Embodiments of the present invention will now be described below with reference to the drawings.

First Embodiment

Figure 1:
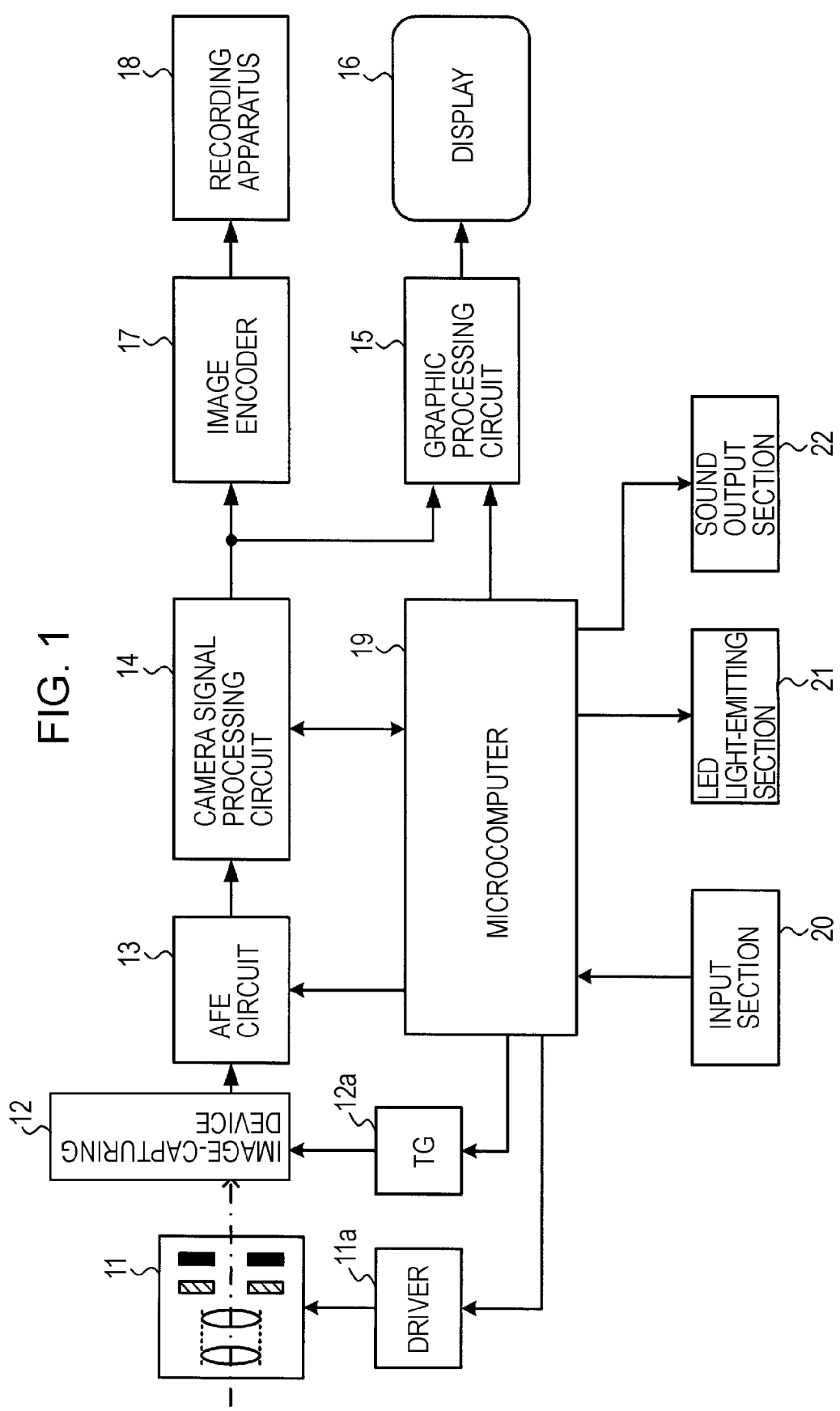
FIG. 1 is a block diagram showing the configuration of a main part of an image-capturing apparatus according to a first embodiment of the present invention.

FIG. 1 is a block diagram showing the configuration of the main part of an image-capturing apparatus according to a first embodiment of the present invention.

The image-capturing apparatus shown in FIG. 1 is implemented as a digital still camera or a digital video camera. The image-capturing apparatus includes an optical block 11, a driver 11a, an image-capturing device 12, a timing generator (TG) 12a, an analog front end (AFE) circuit 13, a camera signal processing circuit 14, a graphic processing circuit 15, a display device 16, an image encoder 17, a recording apparatus 18, a microcomputer 19, an input section 20, an LED (Light Emitting Diode) light-emitting section 21, and a sound output section 22.

The optical block 11 includes a lens for collecting light from a subject into the image-capturing device 12, a driving mechanism for moving the lens in order to perform focusing and zooming, a shutter mechanism, an iris mechanism, and the like. On the basis of a control signal from the microcomputer 19, the driver 11a controls driving of each mechanism inside the optical block 11.

The image-capturing device 12 is, for example, a CCD (Charge Coupled Device) type or CMOS (Complementary Metal Oxide Semiconductor) type solid-state image-capturing device, is driven on the basis of a timing signal output from the TG 12a, and converts incident light from the subject into an electrical signal. Under the control of the microcomputer 19, the TG 12a outputs a timing signal.

The AFE circuit 13 samples and holds the image signal output from the image-capturing device 12 so as to satisfactorily maintain the S/N (Signal/Noise) ratio by CDS (Correlated Double Sampling) processing, controls gain by AGC (Auto Gain Control) processing, performs A/D conversion, and outputs digital image data.

The camera signal processing circuit 14 performs, on the image data from the AFE circuit 13, AF (Auto Focus), AE (Auto Exposure), a detection process for various kinds of image quality correction processing, and an image quality correction process corresponding to a signal output from the microcomputer 19 on the basis of detection information. As will be described later, in this embodiment, the camera signal processing circuit 14 has a face detection function and a function of extracting data of a face region.

The graphic processing circuit 15 converts image data output from the camera signal processing circuit 14 into a signal to be displayed on the display device 16, and supplies the signal to the display device 16. Furthermore, the graphic processing circuit 15 combines information, such as an expression score (to be described later), in an image in response to a request from the microcomputer 19. The display device 16 is formed of, for example, an LCD (Liquid Crystal Display), and displays an image on the basis of the image signal from the graphic processing circuit 15.

The image encoder 17 compresses and codes the image data output from the camera signal processing circuit 14 and outputs the coded data to the recording apparatus 18. More specifically, the image encoder 17 compresses and codes image data for one frame, which is processed by the camera signal processing circuit 14, in accordance with a coding method such as JPEG (Joint Photographic Experts Group), and outputs the coded data of a still image. Not only a still image but also data of a moving image may also be compressed and coded.

The recording apparatus 18 is an apparatus for recording coded data from the image encoder 17 as an image file, and is implemented, for example, as an apparatus for driving a portable recording medium such as a magnetic tape or an optical disc, or an HDD (Hard Disk Drive).

The microcomputer 19 includes a CPU (Central Processing Unit), and memory such as a ROM (Read Only Memory) and a RAM (Random Access Memory), and centrally controls the image-capturing apparatus by executing a program stored in the memory.

The input section 20 outputs, to the microcomputer 19, a control signal corresponding to operation input to various kinds of input switches by a user. As the input switches, for example, a shutter release button, cross keys used to select various kinds of menus and to set an operation mode, and others are provided.

On the basis of a control signal from the microcomputer 19, the LED light-emitting section 21 allows LEDs provided on the exterior surface of the image-capturing apparatus to be turned on. Examples of the LED include those indicating that a self-timer function is being operated.

On the basis of a control signal from the microcomputer 19, the sound output section 22 outputs sound, such as operation confirmation sound. When an audio data encoder/decoder is provided, reproduction sound when the audio data is reproduced may be output.

In this image-capturing apparatus, signals that are photo-received and photoelectrically converted by the image-capturing device 12 are sequentially supplied to the AFE circuit 13, whereby a CDS process and an AGC process are performed, and thereafter the signals are converted into digital image data. The camera signal processing circuit 14 performs an image quality correction process on the image data supplied from the AFE circuit 13, and supplies the image data after processing to the graphic processing circuit 15, whereby the image data is converted into an image signal for display. As a result, an image (camera through image) currently being captured is displayed on the display device 16, so that the image-capturing person can confirm the angle of view by viewing the image.

In this state, when an instruction for recording an image is made to the microcomputer 19 as a result of the shutter release button of the input section 20 being depressed, the image data from the camera signal processing circuit 14 is supplied to the image encoder 17, whereby a compression and coding process is performed, and the image data is recorded by the recording apparatus 18. When a still image is to be recorded, image data for one frame is supplied from the camera signal processing circuit 14 to the image encoder 17. When a moving image is to be recorded, processed image data is continuously supplied to the image encoder 17.

Next, a description will be given of an image-capturing operation mode provided in the image-capturing apparatus. The image-capturing apparatus has a mode in which, when a still image is to be captured, the face of an image-captured person is detected from the captured image, the expression of the face is evaluated, and information indicating the degree of the evaluation is notified to the image-captured person, and a mode in which a shutter is released automatically in response to the degree of the evaluation and still image data is recorded in the recording apparatus 18. Hereinafter, the former mode will be referred to as an "expression evaluation mode", and the latter mode will be referred to as an "expression response recording mode".

The expression evaluation mode serves the role of evaluating the expression of a face when the face is detected from the captured image, notifying the image-captured person of information corresponding to the evaluation, and prompting the image-captured person to form an expression more appropriate for image capturing. For example, the degree of whether or not the expression is a smile is evaluated. Furthermore, in the expression response recording mode, when the evaluation value exceeds a predetermined value, it is determined that the face of the image-captured person has become an expression appropriate for image capturing, and still image data is automatically recorded. This assists that an image with a high degree of satisfaction for the image-captured person can be recorded. This embodiment has been described as having two modes, that is, an expression evaluation mode and an expression response recording mode. Alternatively, this embodiment may have only the expression response recording mode.

Figure 2:
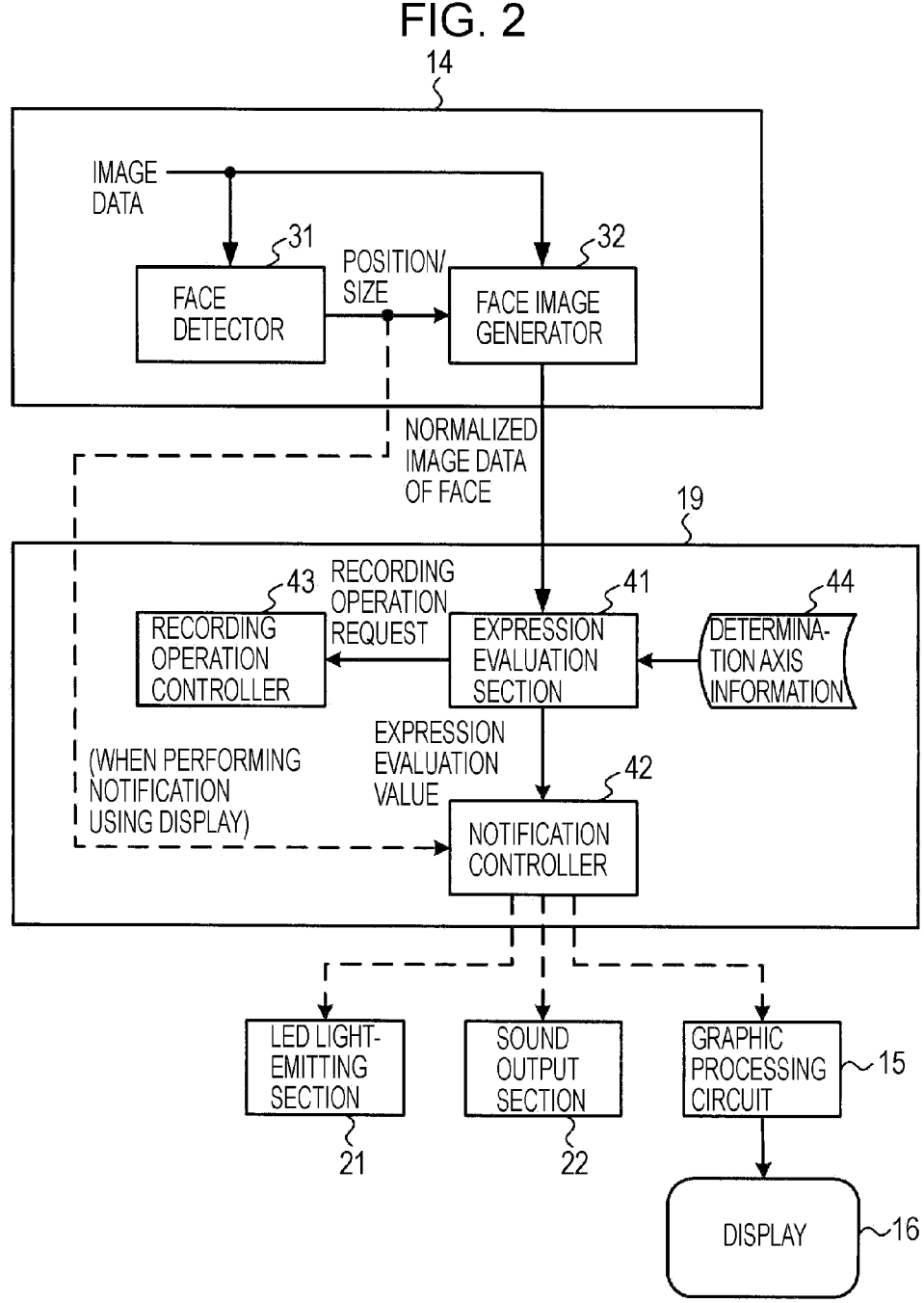
FIG. 2 is a block diagram showing functions provided in the image-capturing apparatus so as to implement an expression evaluation mode and an expression response recording mode.

FIG. 2 is a block diagram showing functions provided in the image-capturing apparatus so as to implement an expression evaluation mode and an expression response recording mode.

As shown in FIG. 2, the image-capturing apparatus includes, as functions for implementing each of the image-capturing operation modes, a face detector 31, a face image generator 32, an expression evaluation section 41, a notification controller 42, and a recording operation controller 43. In this embodiment, the face detector 31 and the face image generator 32 are implemented by hardware inside the camera signal processing circuit 14. The expression evaluation section 41, the notification controller 42, and the recording operation controller 43 are implemented as functions of software executed by the microcomputer 19. However, each of these functions may be implemented by either hardware or software. The microcomputer 19 has prestored therein determination axis information 44 used for expression evaluation computation by the expression evaluation section 41 on a memory such as a ROM provided therein. As will be described later, the determination axis information 44 contains coefficient information of a vector indicating the determination axis of an expression obtained by performing linear discriminant analysis on the basis of signal components obtained by principal component analysis from sample data of many pieces of faces on two expressions.

At this point, the operation of each function shown in FIG. 2 will be described with reference to FIGS. 3 and 4 described below. First, FIG. 3 shows the outline of operations in the expression evaluation mode.

In the expression evaluation mode, at first, on the basis of image data that is obtained by image capturing using the image-capturing device 12 and that is transmitted through the camera signal processing circuit 14, the face detector 31 detects the face of an image-captured person from the image (step S1). Then, detection information indicating the region of the detected face is output to the face image generator 32. As in this embodiment, when a notification is made by displaying information corresponding to the expression evaluation value on the display device 16, the detection information of the face from the face detector 31 is also supplied to the notification controller 42 of the microcomputer 19.

As a technique for detecting a face, a well-known technique can be used. For example, a technique disclosed in Japanese Unexamined Patent Application Publication No. 2005-157679 can be used. In this technique, first, a difference of luminance between two pixels in a face image is learnt, and it is stored in advance as an amount of a feature. Then, as shown in step S1 of FIG. 3, a window W1 of a fixed size is sequentially assigned to an input image, whether or not a face is contained in the image within the window W1 is estimated on the basis of the feature amount, and the estimated value is output. At this time, by sequentially reducing the input image and by performing the same process, it is possible to make an estimation by using the window W1 of a fixed size. Then, the region where a face exists is finally determined on the basis of the estimated value obtained by those operations.

Next, the face image generator 32 extracts data of a region Af of the detected face (step S2). Then, the face image generator 32 converts the extracted image data into image data of a fixed size, normalizes it, and supplies the image data to the expression evaluation section 41 (step S3).

At this point, in this embodiment, as examples of detection information of the face, which is output from the face detector 31, the position (for example, the coordinate of the left end, hereinafter referred to as "position information of the face") of a detection frame of a rectangle surrounding the periphery of the face, and the size of the detection frame (for example, the number of pixels in each of the horizontal and vertical directions, hereinafter referred to as "size information of the face") are assumed to be output. In this case, the face image generator 32 accesses the memory (RAM) in which image data for which the face is to be detected is temporarily stored, and reads only the data of the region corresponding to the position information and the size information of the face from the face detector 31.

The extracted image data is normalized by being subjected to resolution conversion as image data of a fixed size (resolution). The image size after the normalization becomes a size that becomes a processing unit when the expression evaluation section 41 evaluates the expression of the face. In this embodiment, as an example, the size is set at 48×48 pixels.

As the image extraction function and the resolution conversion function provided in the face image generator 32, the same functions that are typically provided for the camera signal processing circuit 14 of the related art for the purpose of detection and generation of an output image can also be used.

Next, on the basis of the normalized image data of the face from the face image generator 32 and the determination axis information 44 that is stored in advance, the expression evaluation section 41 performs an operation for evaluating the degree of appropriateness of the expression of the face and outputs the expression evaluation value (step S4). The expression evaluation value indicates the degree to which the expression of the face is close to one of the two expressions. For example, as two expressions, "smile" and "usual expression" are used. The higher the expression evaluation value, the higher the degree to which the expression is estimated to be a "smile" rather than "usual expression". The method of computing the expression evaluation value will be described later.

Next, the notification controller 42 notifies the image-captured person of information corresponding to the expression evaluation value output from the expression evaluation section 41 (step S5). For example, the information corresponding to the expression evaluation value is displayed via the graphic processing circuit 15 on the display device 16 oriented toward the image-captured person side. In this case, display may be performed such that a face to be evaluated is specified within the display device 16 on the basis of the position and the size information on the face supplied from the face detector 31. A difference in the expression evaluation value may be notified on the basis of a change in the luminance, a change in the blinking speed, and a change in the color of the LED light-emitting section 21 by using the LED light-emitting section 21. Alternatively, a notification may be made by outputting sound that differs according to the expression evaluation value via the sound output section 22.

In the following description, the expression evaluation section 41 is assumed to evaluate, as an example, the degree about whether the expression of the face is a smile or expressionless. In this embodiment, in particular, the information corresponding to the expression evaluation value is notified to the image-captured person by displaying it on the display device 16, the display screen thereof being oriented toward the image-captured person side. In FIG. 3, an example is shown in which a bar graph indicating a "smile score", which is a value corresponding to the expression evaluation value, is displayed on the display device 16.

Figure 4:
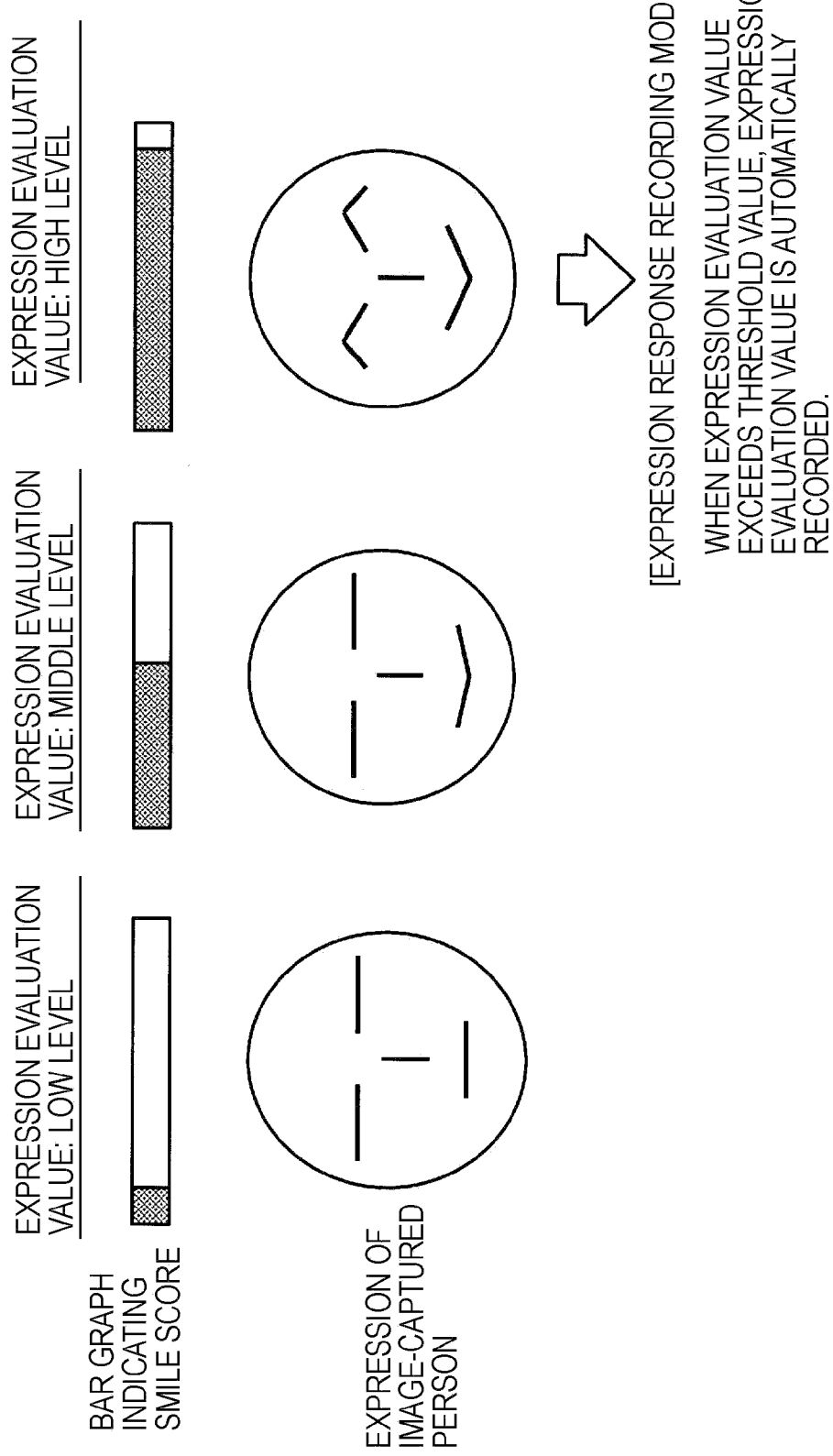
FIG. 4 illustrates the movement of a bar graph indicating a smile score.

FIG. 4 illustrates the movement of a bar graph indicating a smile score.

As shown in FIG. 4, the stronger the degree that the expression of the face is a smile, the higher the expression evaluation value becomes, and the higher the degree that the expression of the face is a usual expression, the lower the expression evaluation value becomes. The smile score shown in the bar graph varies continuously or in a step-like manner in proportion to the expression evaluation value. The bar graph is displayed on the display device 16 oriented toward the image-captured person side. The image-captured person can recognize whether or not his/her expression is a smile appropriate for image capturing by viewing the bar graph in real time at the time of image capture. As a result, the bar graph functions to assist the image-capturing operation so that the image-captured person is prompted to form an expression appropriate for image capturing and a more satisfactory image can be captured. As will be described later, specific character information for prompting an image-captured person with a low expression evaluation value to form a smile may be displayed.

At this point, when the mode is set to an "expression response recording mode", the expression evaluation section 41 performs control so that, when the expression evaluation value exceeds a predetermined threshold value, the shutter is released automatically, that is, the captured image is recorded. In FIG. 2, the recording operation controller 43 is a block for controlling the recording operation of captured image data. In a normal image-capturing operation, when the recording operation controller 43 detects that the shutter release button of the input section 20 is depressed, the recording operation controller 43 performs control so that each section of the image-capturing apparatus performs an appropriate image-capturing operation (for example, exposure operation and signal processing operation) at the time of recording, thereby the image encoder 17 encodes the captured image data, and the coded data is recorded by the recording apparatus 18. Then, when the expression evaluation value exceeds the predetermined threshold value, the expression evaluation section 41 requests the recording operation controller 43 to perform an operation of recording image data.

As a result, when a face is detected from the captured image and the expression of the face is evaluated to be appropriate for image capturing (here, when the degree to which the face expression is close to a smile becomes high), the captured image at that time is automatically recorded. Therefore, when compared with the self-timer function of the related art (that is, the function of recording a captured image after a fixed period of time has elapsed from when the shutter release button is depressed), it becomes possible to reliably capture an image in which the image-captured person has a satisfactory expression, and it is possible to increase the degree of satisfaction of the image-captured person and the image-capturing person.

Next, a description will be given below of an example of a specific display screen for a smile score on the display device 16.

Figure 5:
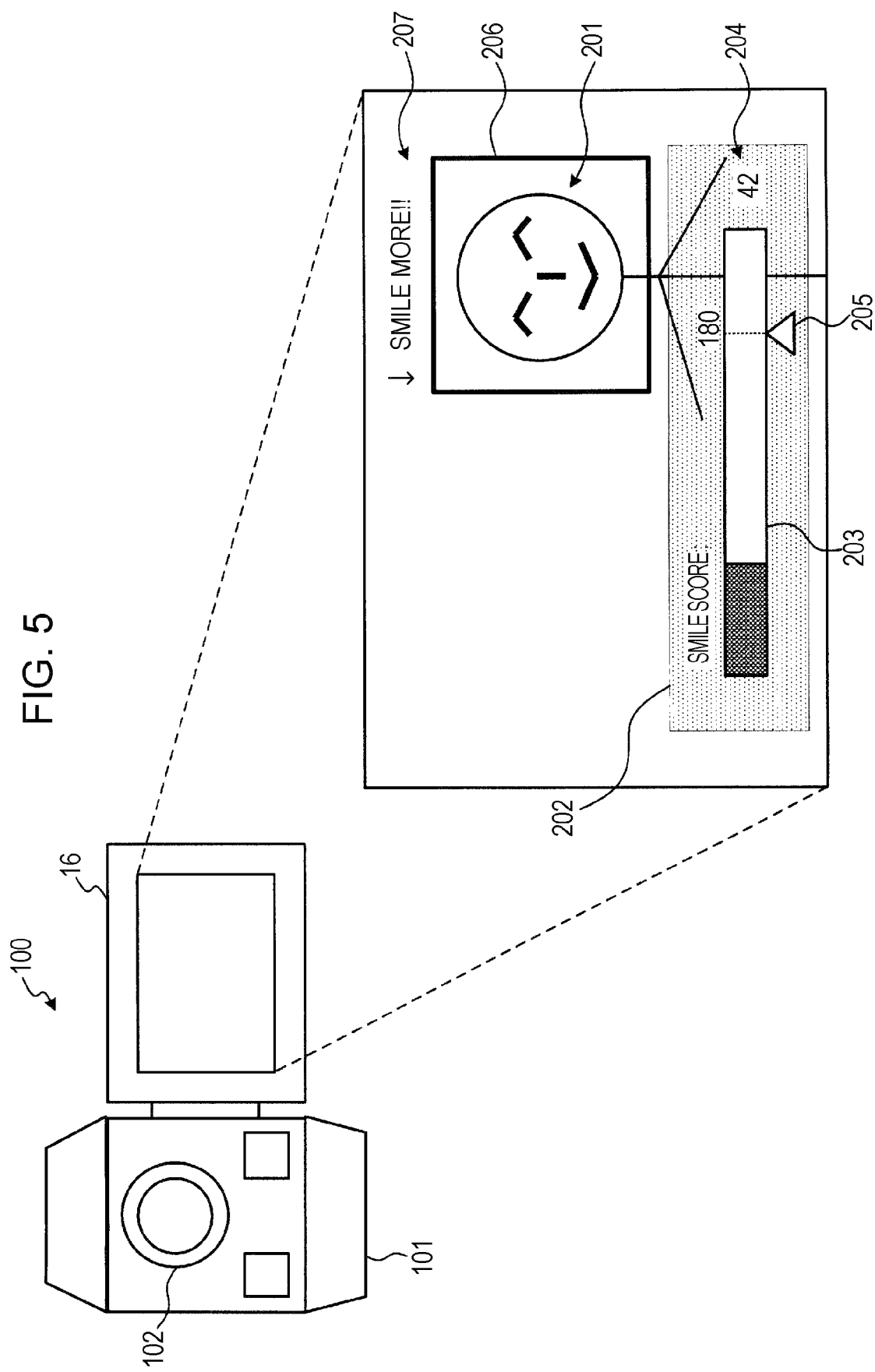
FIG. 5 shows an example of a display screen for a smile score using a bar graph.

FIG. 5 shows an example of the screen display for a smile score using a bar graph.

In FIG. 5, a digital video camera 100 is assumed as an image-capturing apparatus. In the digital video camera 100, a display device 16 for confirming the angle of view is provided on the side surface of a camera main unit 101. In the digital video camera 100 of such a configuration, generally, the angle of the display screen of the display device 16 is variable, so that, as shown in FIG. 5, the display screen can be oriented in the direction in which an image-capturing lens 102 is provided, that is, in the direction of the image-captured person. In the expression evaluation mode and the expression response recording mode, the digital video camera 100 is used in a state in which the display screen of the display device 16 is oriented toward the image-capturing person side, and information corresponding to the expression evaluation value is displayed together with the captured image of the subject.

In the example of the screen display of FIG. 5, a smile score display section 202 is combined on a captured image containing a face 201, and is displayed. On the smile score display section 202, a smile score corresponding to the expression evaluation value is displayed as a bar graph 203 and also, the smile score is displayed as a numeric value on a numeric value display section 204. In the expression response recording mode, a boundary display icon 205 indicating the boundary of the smile score when a captured image is automatically recorded is displayed. In this example, a threshold value in the form of a numeric value is displayed on the boundary display icon 205.

In the example of FIG. 5, together with the smile score display section 202, a face display frame 206 is displayed around the face 201 corresponding to the smile score, so that the face 201 for which a smile is to be evaluated is displayed in an easily understandable manner. Furthermore, a character display section 207 for displaying a character that differs in accordance with the expression evaluation value is provided in the vicinity of the face display frame 206, so that the image-captured person is prompted to form, the lower the degree of being a smile, a stronger smile by using a character.

In the expression response recording mode, the threshold value of the expression evaluation value when a captured image is recorded may be set by a user as desired, so that the image-captured person can freely determine to what degree he/she wishes a face expression is close to a smile before a captured image is recorded. In the example of FIG. 5, for example, by the user depressing the direction key in a side-to-side direction (not shown) provided in the input section 20, the threshold value of the expression evaluation value is changed, the boundary display icon 205 moves in the side-to-side direction, and it is possible for the user to visually recognize a smile score corresponding to the threshold value of the expression evaluation value. In this case, the direction key operated in the side-to-side direction may automatically serve as a key for setting a threshold value of an expression evaluation value when the mode is set to the expression response recording mode, thereby making it possible to increase the ease of operation for the user.

The changing of the threshold value of the expression evaluation value is not limited to the above-described method, and may be performed from a dedicated setting screen selected from the menu screen. Alternatively, a dedicated operation key may be provided to change the threshold value of the expression evaluation value. When the display device 16 is of a touch panel type, for example, the threshold value may be changed by allowing a finger to contact a key image displayed on the display device 16. Furthermore, a threshold value may be changed by moving a finger in the side-to-side direction with the finger in contact with the boundary display icon 205 of FIG. 5.

Figure 6:
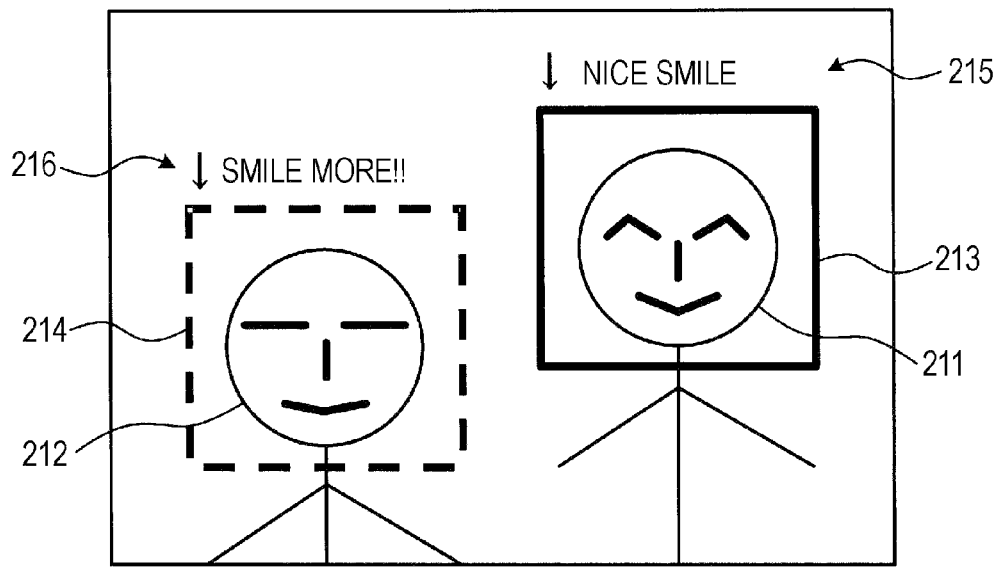
FIG. 6 shows a first example of a screen display for information corresponding to an expression evaluation value when a plurality of faces are detected.

When a plurality of faces are detected from within the image-capture screen, an expression evaluation value may be computed for each of those faces, and information corresponding to those values may be displayed on the display device 16. FIG. 6 shows a first example of a screen display for information corresponding to an expression evaluation value when a plurality of faces are detected.

FIG. 6 shows an example in which two faces 211 and 212 are detected. In the faces 211 and 212, face display frames 213 and 214 are displayed around the face regions, respectively, and character display sections 215 and 216 are provided in the vicinity thereof, respectively. The line type of each of the face display frames 213 and 214 is changed in accordance with the expression evaluation value for each of the faces 211 and 212, and a different character corresponding to the expression evaluation value is displayed on the character display sections 215 and 216.

In the example of FIG. 6, the face 211 is evaluated to have a sufficiently strong smile, but the face 212 is evaluated to have an insufficient smile. For example, the expression evaluation value of the face 211 has reached a threshold value for automatic recording, but the expression evaluation value of the face 212 indicates a value a little lower than the threshold value. At this time, such differences in the evaluation state are notified to the corresponding image-captured person with a face display frame 213 for the face 211 being indicated by a solid line and a face display frame 214 for the face 212 being indicated by a broken line and also, character information for prompting that a smile be formed stronger is displayed on the character display section 216. In this example, differences in the expression evaluation value are shown using the line type of the face display frames 213 and 214. In addition, differences in the expression evaluation value may be notified by, for example, differences in the luminance, the color, the thickness of the face display frame.

Figure 7:
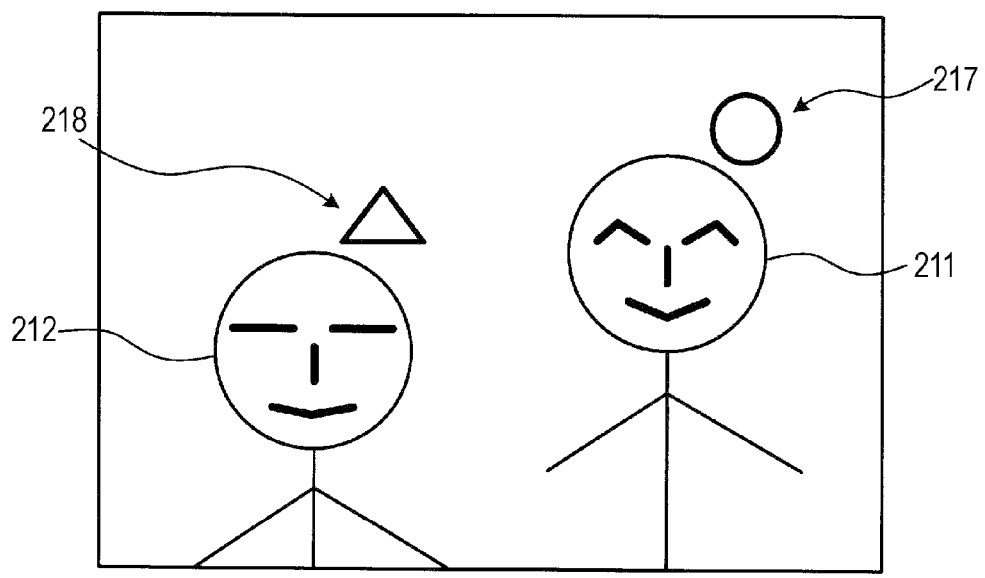
FIG. 7 shows a second example of a screen display for information corresponding to an expression evaluation value when a plurality of faces are detected.

FIG. 7 shows a second example of a screen display for displaying information corresponding to an expression evaluation value when a plurality of faces are detected.

Also, in the example of FIG. 7, similarly to FIG. 6, two faces, that is, faces 211 and 212, are detected. The face 211 is evaluated to have a sufficiently strong smile, and the face 212 is evaluated to have an insufficiently strong smile. Furthermore, in the example of FIG. 7, differences in the expression evaluation value are notified to the image-captured person by showing symbols 217 and 218 corresponding to the expression evaluation value in the vicinity of each of the regions of the faces 211 and 212, respectively.

In the manner described above, as a result of performing notification of information corresponding to an expression evaluation value by using a display device, it is possible to notify the image-captured person of information corresponding to an expression evaluation value by various methods, such as by displaying a smile score corresponding to an expression evaluation value using a bar graph or a numeric value, the line type, color, brightness, and the like of a face display frame being changed in accordance with an expression evaluation value, or a character for prompting the image-captured person to smile in accordance with an expression evaluation value being displayed in the vicinity of a face. In particular, in the case of a digital video camera, since a notification can be made using a display device in which the display screen orientation is variable, which is heretofore provided, it is possible to reliably record an image with a high satisfaction for the user without causing a large increase in the development/manufacturing cost due to the changing of the basic configuration of the camera.

In the foregoing, a digital video camera is used as an example in which a display device in which the display screen orientation is variable is installed. Some digital still cameras provided with a display device for confirming the angle of view on a side opposite to an image-capturing lens are such that the display screen orientation is variable. If the display screen thereof can be oriented toward the image-captured person side, the above-described display image can be displayed, making it possible to notify the image-captured person of information corresponding to the expression evaluation value.

Next, a description will be given of an expression evaluation method used in this image-capturing apparatus.

FIG. 8 conceptually shows information to be generated in advance for the purpose of expression evaluation, and the flow of information generation.

In this embodiment, as a method for evaluating an expression, a so-called "Fisher linear discriminant analysis" is used. In this method, first, many sample images of faces each having two expressions are provided in advance. On the basis of the data of these sample images, by considering as a two-class problem between two expressions, a determination axis $A_d$ by which the two expressions are satisfactorily determined by linear discriminant analysis (LDA) is formed in advance. Then, when an expression evaluation is to be made, the inner product of the input data of the face image and the determination axis $A_d$ is determined to compute the expression evaluation value.

As shown in FIG. 8, in this embodiment, a sample image Ps of a smile and a sample image Pn of a usual expression are used. The sample images Ps and Pn are provided in advance as images that are normalized to a fixed size of, for example, 48×48 pixels. Then, the data of these sample images is handled as vector data of 48 ... × ... 48 dimensions, and an LDA process is performed. However, the vector space becomes a space with a very large dimension having 48 ... × ... 48 coordinate axes. Therefore, prior to the LDA process, principal component analysis (PCA) is performed on those vector data so as to be converted (dimension-compressed) into data with a low dimension space that efficiently indicates only the features of the face.

In this PCA process, first, it is considered to obtain M axes so that the variance among sample image groups of N dimensions (N=48 ... × ... 48) of input M (for example, M=300) becomes a maximum. Such axes are determined as solutions (intrinsic vector) of an intrinsic value problem of a covariance matrix of an image group, and by extracting only vector components having a comparatively large coefficient as principal components, the data can be compressed into data of N' dimensions (N>>N') of only vector components suitable for showing the features of the face. It is known that, for example, by setting N'=approximately 40, sufficient accuracy can be maintained for the determination of the face expression. By excluding several components starting from the large coefficient from among the principal components obtained by the PCA process, the number of dimensions can be reduced further and the burden of the next PCA process can be reduced while maintaining the expression determination accuracy.

Figure 9A:
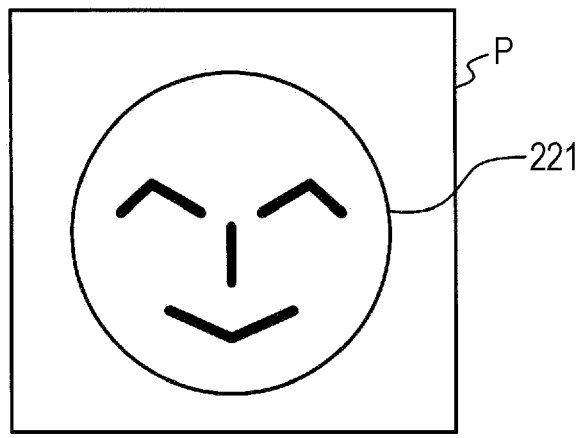
FIGS. 9A, 9B, and 9C illustrate processes for masking a sample image to be input at the time of a PCA process.
Figure 9B:
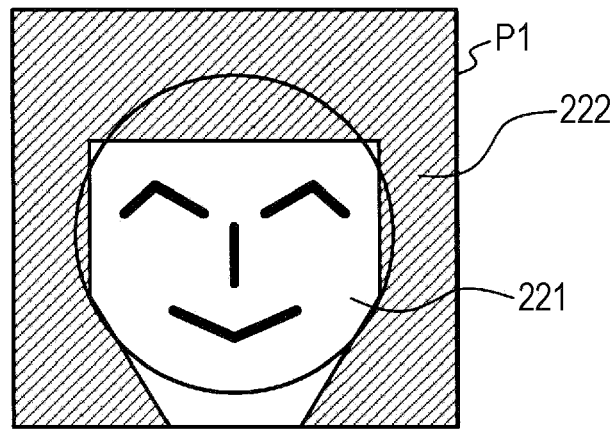
Figure 9C:
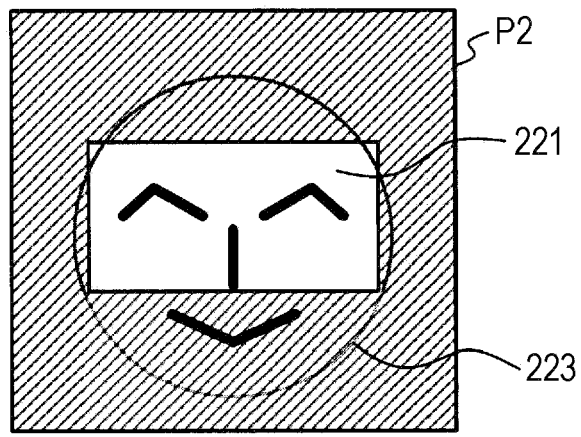

FIGS. 9A, 9B, and 9C illustrate processing for masking a sample image to be input at the time of a PCA process.

As shown in FIG. 9A, when a PCA process is performed by using as it is a sample image P in which a face 221 is image-captured in a rectangular region of a predetermined size, there can be a case in which appropriate principal components cannot necessarily be selected due to the background of the face 221, the hair, and the like. For this reason, as shown in FIG. 9B, by applying a mask 222 to the region other than the face 221, the sample image is converted into a sample image P1 in which only the face region remains as much as possible, and a PCA process is performed in a state in which the information density of the face is increased, making it possible to perform dimension compression with higher accuracy. Furthermore, the mouth within the face region is greatly changed depending on the expression and often becomes a disturbance element. Therefore, as shown in FIG. 9C, by performing a PCA process using a sample image P2 in which a mask 223 is applied even to the region of the mouth, it is possible to further increase the accuracy of dimension compression.

Referring back to FIG. 8, a description will be given below. Each sample image of a smile that is dimension-compressed by a PCA process and a usual expression is converted into vector data in the partial space (PCA space $S_{PCA}$) having only coordinate axes that efficiently show the features of a face. FIG. 8 schematically shows a state in which the sample image Ps of a smile and a sample image Pn of a usual expression are projected on the PCA space $S_{PCA}$. As shown in FIG. 8, it may be said that sample images having the same expression exist comparatively close to each other in the PCA space $S_{PCA}$. Therefore, a sample image group of these expressions is regarded as two clusters CLs and CLn, and a projection axis (determination axis $A_d$) that best separates the clusters is formed by an LDA process. Such a determination axis $A_d$ is called a "Fisher's projection axis".

In the LDA process, in general, a determination axis is determined such that inter-class and intra-class variances projected on the intrinsic vector of N' dimensions become a maximum. That is, an intrinsic vector corresponding to the maximum intrinsic value of each of inter-class and intra-class covariance matrixes is determined, and the intrinsic vector is set as a vector (Fisher vector) in the determination axis $A_d$. The relation between a covariance matrix and an intrinsic value and the relation between a covariance matrix and an intrinsic vector are shown in equations (1) and (2), respectively.

$$R_B \vec{\mu} = \lambda R_W \vec{\mu} \tag{1}$$

$$\Leftrightarrow R_W^{-1} R_B \vec{\mu} = \lambda \vec{\mu} \tag{2}$$

($R_W$: Intra-class covariance matrix, $R_B$: Inter-class covariance matrix, λ: Intrinsic value)

Fisher vector→Intrinsic vector corresponding to maximum intrinsic value

For the computation of the reverse matrix, the intrinsic value, and the intrinsic vector of the left side of equation (2), an LU (Lower-Upper) decomposition method, a QR decomposition method (Q: orthogonal matrix, R: upper triangular matrix), and a Gaussian elimination method can be used, respectively. The expression evaluation section 41 prestores information, such as a coefficient of each component of a Fisher vector, as information (determination axis information 44) on the determination axis $A_d$ obtained in the above-described manner in a ROM or the like.

Figure 10:
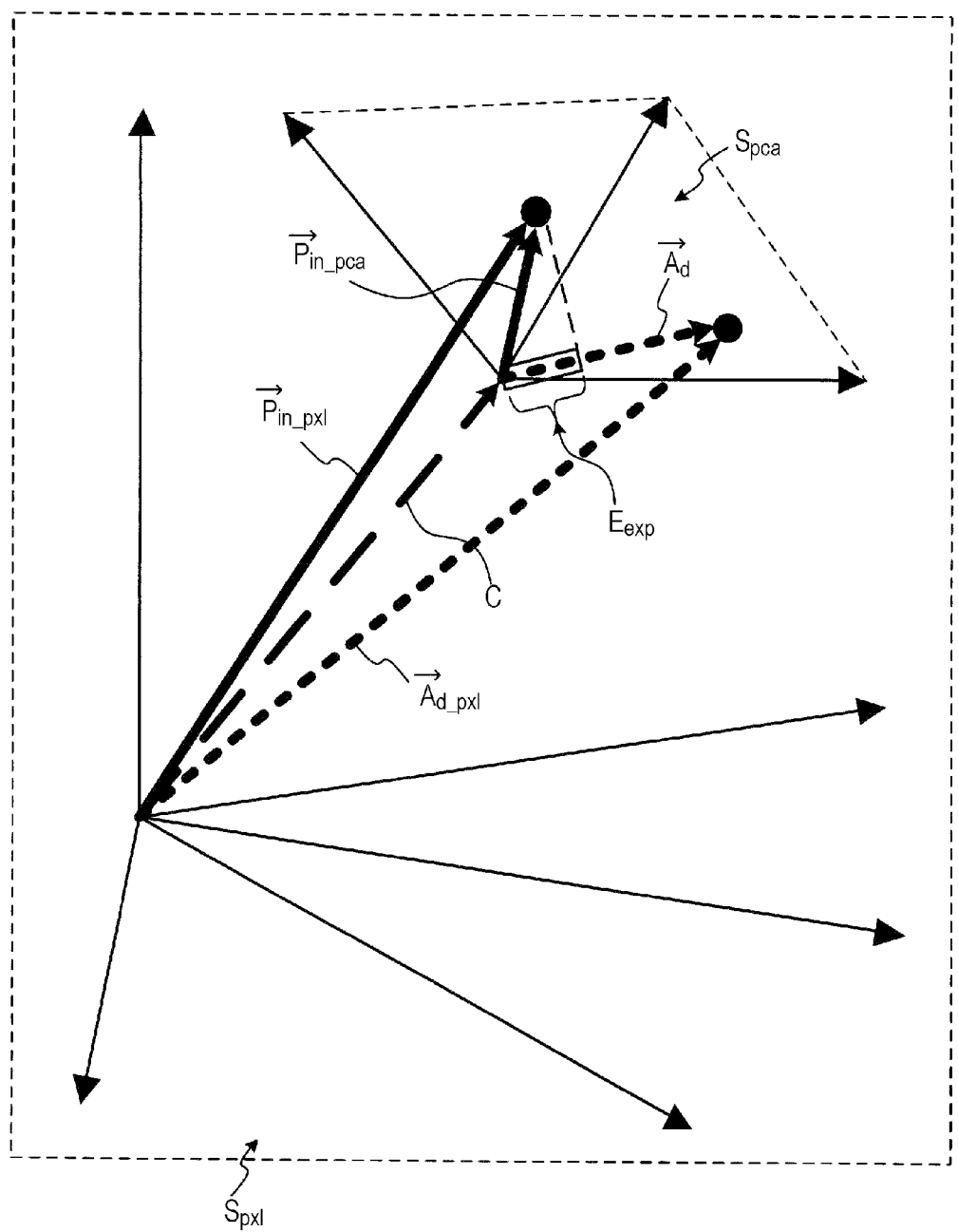
FIG. 10 conceptually shows a relation between a determination axis and an input image of a face in the pixel space and in the PCA space.

FIG. 10 conceptually shows relations between a determination axis and an input image of a face in the pixel space and in the PCA space.

The basic procedure of expression determination using the above-described determination axis $A_d$ is as follows. At first, image data of a face detected from a captured image is subjected to a PCA process, and principal components are extracted. Then, the expression of the face image, as shown in the PCA space $S_{PCA}$ of FIG. 10, is evaluated as projection components of the PCA-processed face image vector (input face image vector) with respect to the determination axis $A_d$. That is, the computation of the expression evaluation value $E_{exp}$ can be computed by the inner product of the input face image vector and the Fisher vector (see equation (5-1)).

$$\vec{P}_{in,px1} \approx 1.45\vec{\mu}_1 + 0.86\vec{\mu}_2 + 0.64\vec{\mu}_3 + \ldots + 0.05\vec{\mu}_{N'} + C \tag{3}$$

$$\vec{A}_{d,px1} \approx 0.98\vec{\mu}_1 + 0.45\vec{\mu}_2 + 0.38\vec{\mu}_3 + \ldots + 0.09\vec{\mu}_{N'} + C \tag{4}$$

$$E_{exp} = \vec{P}_{in,pca} \cdot \vec{A}_d = \begin{bmatrix} 1.45 \\ 0.86 \\ 0.64 \\ \vdots \\ 0.05 \end{bmatrix} \cdot \begin{bmatrix} 0.98 \\ 0.45 \\ 0.38 \\ \vdots \\ 0.09 \end{bmatrix} \tag{5-1}$$

$$= [\vec{P}_{in,px1} - C] \cdot [\vec{A}_{d,px1} - C] \tag{5-2}$$

$\vec{P}_{in,px1}$: Input face image vector in pixel space $\vec{A}_{d,px1}$: Fisher vector in pixel space $\vec{\mu}_1, \ldots, \vec{\mu}_{N'}$: Vector of principal components $E_{exp}$: Expression evaluation value $\vec{P}_{in,pca}$: Input face image vector after PCA process The information on the Fisher vector can also be converted into information in the pixel space $S_{pxl}$ (the space of the dimension possessed by the original image data before the PCA process). Equation (3) shows an input face image vector as a vector in the pixel space $S_{pxl}$, and equation (4) shows a Fisher vector as a vector in the pixel space $S_{pxl}$. FIG. 10 conceptually shows these relations. As shown in equation (3), equation (4), and FIG. 10, vector components other than principal components $\mu_1$ to $\mu_{N'}$ obtained by the PCA process can be approximated using a constant C as an average value of all the input images. Therefore, the inner product computation shown in equation (5-1) can be equivalently expressed as an inner product computation of vectors in the pixel space $S_{pxl}$, as shown in equation (5-2).

In equation (5-2), since the result of the subtraction between the Fisher vector components and the constant C in the pixel space $S_{pxl}$ can be computed in advance, the expression evaluation section 41 has stored therein the subtraction result and the constant C in advance as the determination axis information 44. Then, when the vector of the face image detected from the captured image is given, the inner product computation of equation (5-2) is performed without performing a PCA process on the vector. In the evaluation value computation for one face using equation (5-2), a maximum number of times subtractions, multiplications, and additions are performed is 48 ... × ... 48 only. Moreover, in practice, only the computation of a coefficient corresponding to the 40 or so principal components $\mu_1$ to $\mu_{N'}$ is performed. Therefore, when compared with the case in which the inner product computation of vectors in the PCA space $S_{PCA}$ is performed, the number of computations can be greatly reduced without decreasing the accuracy of expression evaluation, and the expression evaluation value $E_{exp}$ can be easily computed in real time in a state of angle of view matching before the captured image is recorded.

In such a computation method, for example, even when compared with the case in which an expression is evaluated by matching between a template of many face images and the detected face image, it is possible to perform expression evaluation with a low processing load and with high accuracy. When matching using a template is to be performed, usually, it is necessary to further extract parts, such as the eye or the mouth, from the detected face image and to perform a matching process for each part. In comparison, in the method of this embodiment, after the data of the detected face image is normalized to a fixed size, the face image is replaced with vector information and can be applied to an inner product computation as it is (or only partially applying a mask), and the inner product computation becomes a simple computation composed of subtractions, multiplications, and additions of approximately 40 dimensions as described above.

Figure 11:
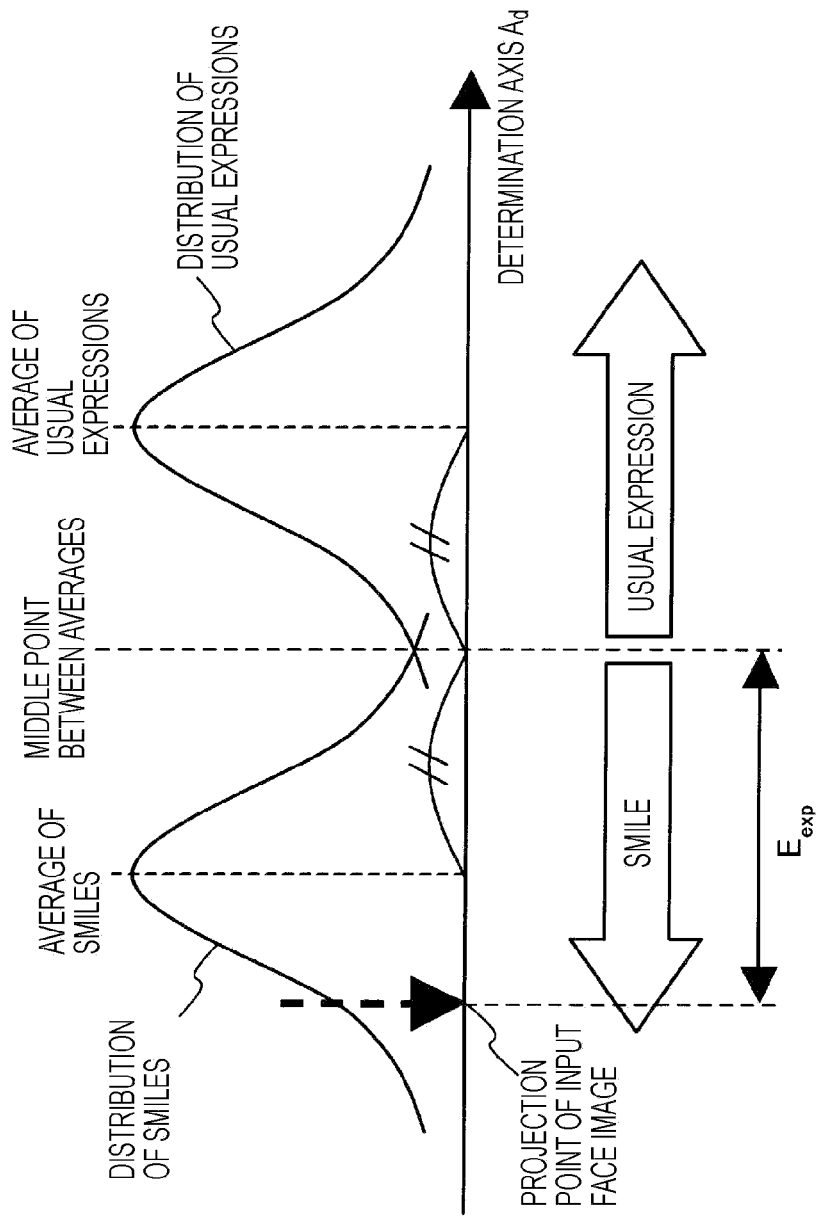
FIG. 11 shows an example of computation when an expression evaluation value is output as a numeric value.

FIG. 11 shows an example of computation when an expression evaluation value is output as a numeric value.

In this embodiment, as an example, on the basis of the result of the PCA process for a sample image, an average of each distribution of face images of smiles and usual expressions in the PCA space is determined, and a projection point of these averages with respect to the determination axis $A_d$ is determined in advance. Then, by using the middle point of the projection points of each average as a reference, the expression evaluation value $E_{exp}$ is converted into a numeric value. That is, as shown in FIG. 11, the distance between the projection point of the input face image with respect to the determination axis and the middle point of the average projection point is set as an expression evaluation value $E_{exp}$, and the side where sample images of smiles are distributed is set to a positive numeric value. As a result, as to which of the smile and the usual expression the detected image of the face is close to can be output as a continuous numeric value, and the higher the expression evaluation value $E_{exp}$, the stronger smile the face is evaluated to have.

Figure 12:
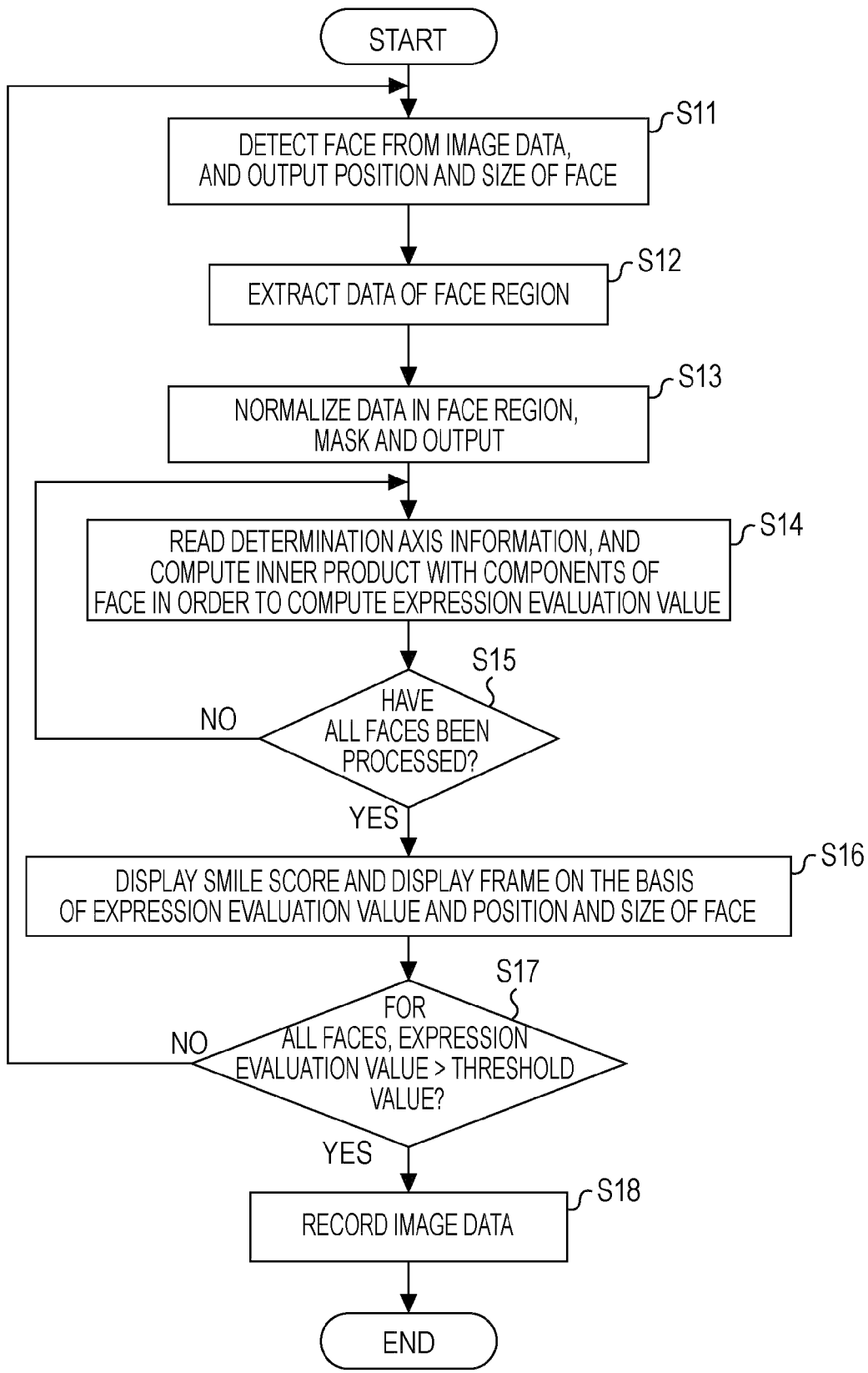
FIG. 12 is a flowchart showing the flow of the processing of the image-capturing apparatus in the expression response recording mode.

Next, a description will be given of the processing procedure of an image-capturing apparatus operating in the expression response recording mode, the processing procedure being summarized in a flowchart. FIG. 12 is a flowchart showing the flow of the processing of the image-capturing apparatus operating in the expression response recording mode.

[Step S11] The face detector 31 detects a face from the data of a captured image and outputs the position information and the size information of all the detected faces to the face image generator 32 and the notification controller 42.

[Step S12] On the basis of the position information and the size information of the face from the face detector 31, the face image generator 32 extracts data in a region of each face detected from the data of the captured image.

[Step S13] The face image generator 32 normalizes the data of each of the extracted face regions into data of a predetermined number of pixels (here, 48×48 pixels), applies masking to a region for which an expression does not need to be detected, and outputs the image data after processing to the expression evaluation section 41.

[Step S14] The expression evaluation section 41 reads the determination axis information 44, and computes the inner product of vectors obtained from one face image supplied from the face image generator 32 and the vector components of the determination axis in order to compute an expression evaluation value. The computed expression evaluation value is, for example, temporarily stored in a RAM or the like.

[Step S15] The expression evaluation section 41 determines whether or not the expression evaluation process has been performed on all the detected faces. When all the detected faces have not been processed, step S14 is performed again on another face, and when all the detected faces have been processed, step S16 is performed.

[Step S16] On the basis of the expression evaluation value computed in step S15 and the position information and the size information of the face corresponding to the expression evaluation value, the notification controller 42 outputs the expression information such as the smile score and the display frame to the graphic processing circuit 15 and displays them in such a manner as to be combined on the display device 16.

[Step S17] The expression evaluation section 41 determines whether or not the expression evaluation values for all the faces, which are computed in step S14, exceed a threshold value. When there is an expression evaluation value that does not exceed the threshold value, the process returns to step S11, where the expression evaluation section 41 instructs the camera signal processing circuit 14 to detect a face, thereby starting a process for detecting the next face and an expression evaluation process. When all the expression evaluation values exceed a threshold value, step S18 is performed.

[Step S18] The expression evaluation section 41 requests the recording operation controller 43 to record the data of the captured image in the recording apparatus 18. as a result, a recording process is performed on the captured image, and the coded image data after the processing is recorded in the recording apparatus 18.

As a result of the above processing, expression evaluation values are computed for all the detected faces, and information corresponding to the expression evaluation value is notified as display information to the image-captured person, thereby making it possible to prompt the image-captured person to form an expression appropriate for image capturing. When all the image-captured persons have formed expressions appropriate for image capturing, the data of the captured image is automatically recorded. Therefore, it is possible to reliably record an image with a high degree of satisfaction for the image-captured person and the image-capturing person.

The determination criterion in step S17 is only an example, and control is not necessarily performed in such a manner that image data is recorded when all the expression evaluation values exceed a threshold value. For example, when expression evaluation values of a fixed ratio of faces among the detected faces exceed a threshold value, image data may be recorded. Alternatively, image data may be recorded when expression evaluation values of a fixed number of faces exceed a threshold value, so that thereafter, expression evaluation is prevented from being performed on an inadvertently image-captured unwanted face.

In the expression response recording mode, when an expression evaluation value exceeds a predetermined threshold value, a captured image is automatically recorded. In addition, for example, when a shutter release button is depressed by an image-capturing person, the expression of the image-captured person is evaluated after a fixed period of time has elapsed, and a captured image may be automatically recorded when the image-captured person forms an expression appropriate for image capturing. In this case, for example, when the depression of the shutter release button is detected, the microcomputer 19 needs only to start counting time and start processing illustrated in FIG. 12 when a fixed period of time has passed. As a result of such processing, the image-capturing person who depressed the shutter release button can reliably move into an image-capturing range, and the ease of operation can be improved.

In the foregoing description, two expressions, that is, a "smile" and an "usual expression", are defined, in addition to the degree to which the expression is close to a smile. In addition, a determination may be performed that an expression lies between a "smile" and expressions other than a "smile" (referred to as a non-smile). Non-smile expressions may include a plurality of expressions that are not a smile, such as a serious expression, a weeping expression, and an angry expression. In this case, a group of non-smile expressions, hereafter, "non-smiles", is determined on the basis of the average of sample images of faces corresponding to the plurality of expressions, and a determination axis for an LDA process is computed on the basis of the group of "non-smiles" and a group of "smiles".

Furthermore, the expression evaluation value does not necessarily need to be a measure of closeness to one particular expression, such as a "smile". For example, by considering a plurality of specific expressions, such as a "smile" and a "serious expression", to be expressions appropriate for image capturing, the expression evaluation value may indicate how close the expression is to any of the plurality of expressions. In this case, also, a group of "expressions appropriate for image capturing" may be determined on the basis of the average of sample images of faces corresponding to the plurality of expressions, and a determination axis for an LDA process may be computed on the basis of the group of "expressions appropriate for image capturing" and the group of "expressions inappropriate for image capturing".

Second Embodiment

Figure 13:
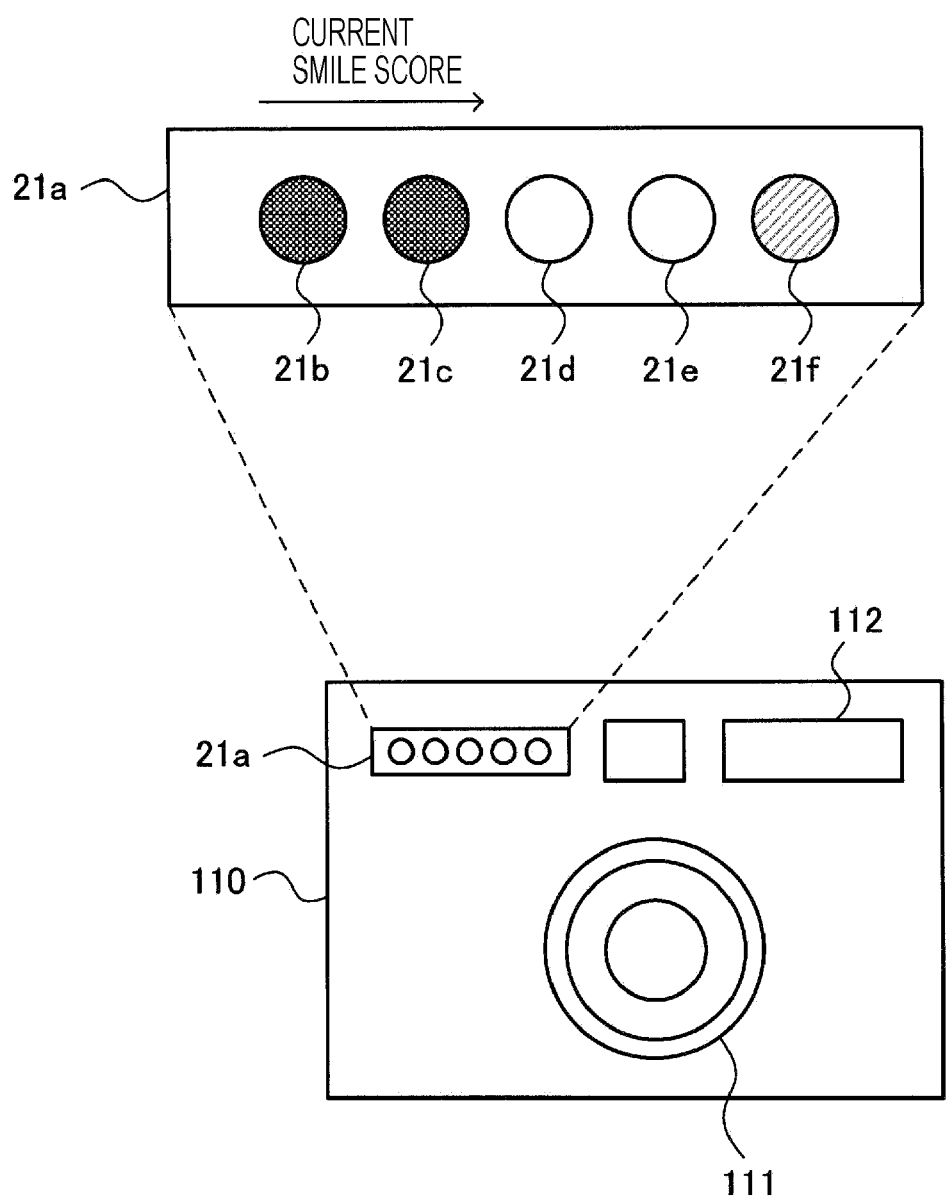
FIG. 13 shows the exterior of an image-capturing apparatus according to a second embodiment of the present invention.

FIG. 13 shows the exterior of an image-capturing apparatus according to a second embodiment of the present invention.

In this embodiment, information corresponding to an expression evaluation value is notified to an image-captured person by using a part of the LED light-emitting section 21 within the configuration illustrated in FIG. 1. In an image-capturing apparatus 110 shown in FIG. 13, a dedicated LED light-emitting section 21a for notifying information corresponding to an expression evaluation value is provided on the side where an image-capturing lens 111, a flash-light-emitting section 112, and the like are installed. The LED light-emitting section 21a is provided with a plurality of LEDs 21b to 21f in one line. Information (here, a smile score) corresponding to the expression evaluation value is notified to the image-captured person on the basis of the number of LEDs emitting light among them. With such a configuration, it is also possible for an image-capturing apparatus such as a digital still camera not having a display device for which the display screen orientation is variable to notify information corresponding to the expression evaluation value to the image-captured person and to assist an image-capturing operation so that an appropriate image can be recorded. Furthermore, by using a small light-emitting device, such as an LED, the enlargement of the main unit of the image-capturing apparatus can be suppressed to a minimum.

Furthermore, in the LED light-emitting section 21a, the LED (the LED 21f in FIG. 13) on the farthest side may be set to indicate a smile score when a captured image is automatically recorded, and this LED may emit light of a color and at a luminance differing from those of the other LEDs. As a result, it is possible to clearly notify a smile score when automatic recording is performed to an image-captured person. Also, it is possible for an image-captured person to recognize the fact that automatic recording has been performed.

Third Embodiment

Figure 14:
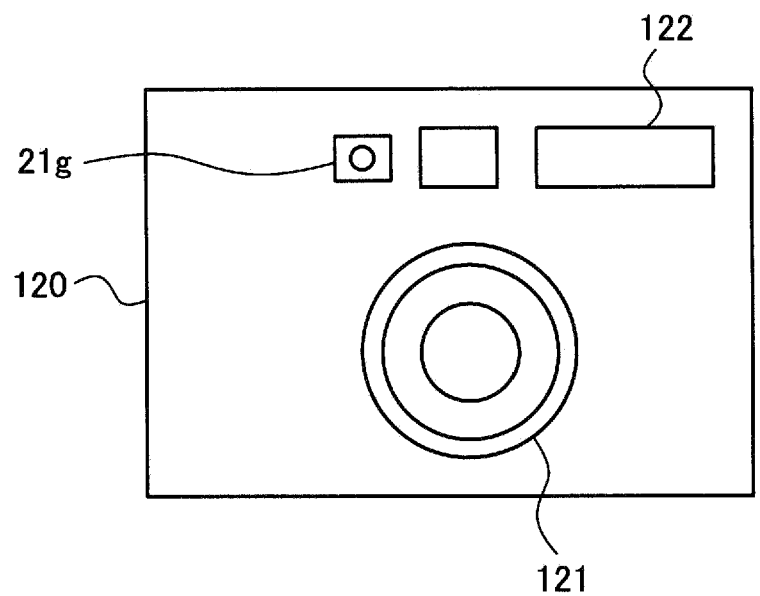
FIG. 14 shows the exterior of an image-capturing apparatus according to a third embodiment of the present invention.

FIG. 14 shows the exterior of an image-capturing apparatus according to a third embodiment of the present invention.

In an image-capturing apparatus 120 shown in FIG. 14, an LED light-emitting section 21g having only one LED is provided on a side where an image-capturing lens 121, a flash light-emitting section 122, and the like are installed. In such an LED light-emitting section 21g, it is possible to notify a smile score to the image-captured person on the basis of an expression evaluation value, for example, by changing the blinking speed of an LED or by changing the luminance/color of an LED. Control is possible so that, for example, as the expression evaluation value increases, the color of the LED is gradually changed from red, to green, and then to blue, or the LED is made to emit brighter light. In the manner described above, by using only one LED, the enlargement of the main unit of the image-capturing apparatus can be prevented more markedly.

When the image-capturing apparatus 120 has a self-timer function of the related art, an LED used when the self-timer operates can also be used in the operation of evaluating an expression. For example, when the self-timer operates, the blinking speed of the LED is gradually increased as time passes from when the shutter release button is depressed until recording is performed. Then, in the expression evaluation mode and in the expression response recording mode, the higher the expression evaluation value, the more the blinking speed of the LED is increased. With such a configuration, it is possible to notify the image-captured person of information corresponding to the expression evaluation value without changing the basic configuration and the exterior of the image-capturing apparatus of the related art. The double-function light-emitting section is not limited to the function of a self-timer section and can also be used as a light-measuring light-emitting section during exposure control. However, in this case, it is necessary for the section to be capable of emitting visible light at least at the time of expression evaluation.

Fourth Embodiment

Figure 15:
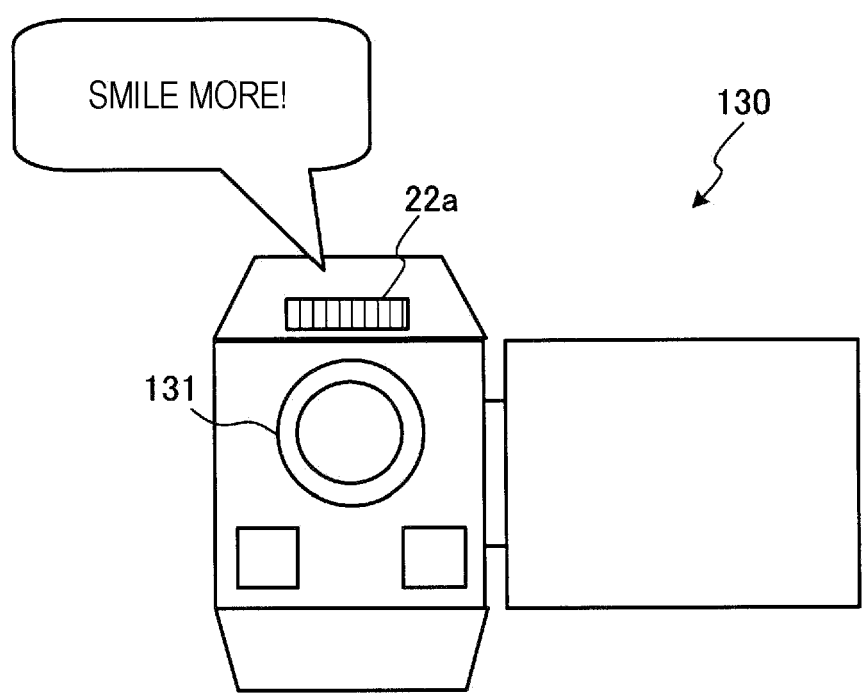
FIG. 15 shows the exterior of an image-capturing apparatus according to a fourth embodiment of the present invention.

FIG. 15 shows the exterior of an image-capturing apparatus according to a fourth embodiment of the present invention.

In each of the above-described embodiments, information corresponding to an expression evaluation value is visually notified. In comparison, in this embodiment, information corresponding to an expression evaluation value is notified using sound by using the sound output section 22 shown in FIG. 2. In an image-capturing apparatus 130 shown in FIG. 15, a speaker 22a is provided on a side where an image-capturing lens 131 is installed, and sound that differs depending on an expression evaluation value is reproduced and output. For sound to be output, for example, in the same manner as for character information shown in FIGS. 5 and 6, sound is used such that the lower the degree of being a smile, the more the image-captured person is prompted to form a strong smile. In this case, the image-capturing apparatus 130 may store data of sound to be reproduced in advance in such a manner as to correspond to an expression evaluation value in a step-like manner. Furthermore, a method of varying the pitch of sound and the output intervals of sound according to the expression evaluation value, or a method of outputting sound of melody, which differs depending on the expression evaluation value, may be adopted. Notification using sound and notification using visual information may be used in combination.

Fifth Embodiment

Figure 16:
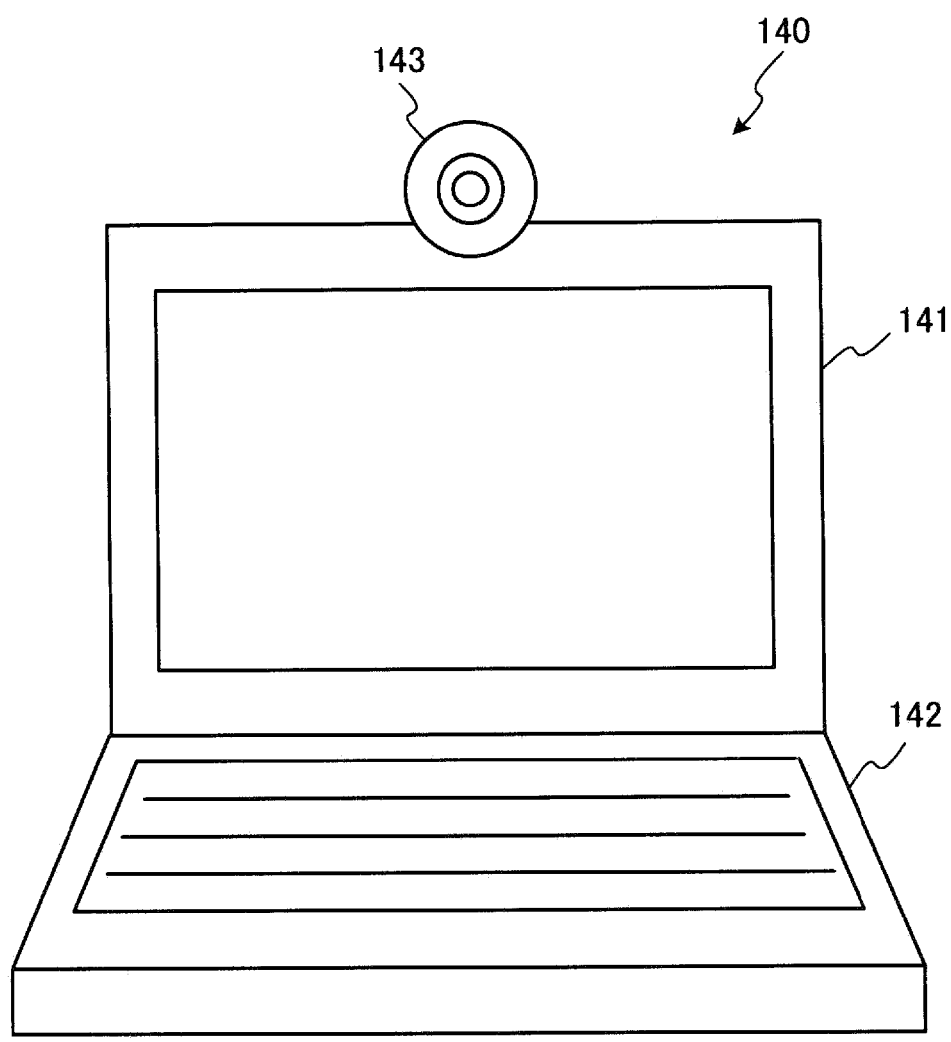
FIG. 16 shows the exterior of a PC (personal computer) according to a fifth embodiment of the present invention.

FIG. 16 shows the exterior of a PC (personal computer) according to a fifth embodiment of the present invention.

The expression evaluation function, the function of notifying information on the basis of an expression evaluation value, and the function of automatically recording an image on the basis of an expression evaluation value in each of the above-described embodiments can also be implemented in various kinds of computers as in a PC 140 shown in FIG. 16. In FIG. 16, as an example, a notebook-type PC 140 in which a display device 141 including an LCD, a keyboard 142, and the main unit are integrally configured is shown. In the PC 140, for example, an image-capture unit 143 is integrally provided in the upper end part of a display device 141, so that the side of the user who is operating the PC 140 can be image-captured. The image-capture unit 143 may be connected to the outside, for example, via a communication interface such as a USB (Universal Serial Bus).

In such a computer, the above-described functions are implemented in the computer by the computer executing a program describing processing content of each of the functions. The program describing the processing content can be recorded in advance on a computer-readable recording medium. Examples of computer-readable recording media include a magnetic disk, an optical disc, a magneto-optical recording medium, and a semiconductor memory.

When this program is to be distributed, for example, portable recording media, such as optical discs on which programs are recorded, are sold. Alternatively, a program can be stored in advance in a storage apparatus of a server computer, and a program can also be transferred from a server computer to another computer.

The computer that executes a program stores, for example, a program recorded on a portable recording medium or a program extracted from the server computer, in the storage apparatus of the computer. Then, the computer reads a program from its storage apparatus and performs processing in accordance with the program. The computer can also directly read a program from a portable recording medium, and can perform processing in accordance with the program. The computer can also perform processing in accordance with received programs one by one each time a program is transferred from a server computer.

It should be understood by those skilled in the art that various modifications, combinations, sub-combinations and alterations may occur depending on design requirements and other factors insofar as they are within the scope of the appended claims or the equivalents thereof.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An image-capturing apparatus for capturing an image using a solid-state image-capturing device, the image-capturing apparatus comprising:
a face detector configured to detect a face of a human being based on an image signal in a period until an image signal obtained by image capturing is recorded on a recording medium;
an expression evaluation section configured to evaluate the expression of the detected face and to compute an expression evaluation value indicating the degree to which the detected face is closer to a specific expression than to expressions other than the specific expression; and
a notification section configured to output notification information corresponding to the computed expression evaluation value,
wherein the notification section notifies, as the notification information, information that visually indicates the magnitude of the expression evaluation value to an image-captured person side, and
the notification section comprises a light-emitting section used to provide both a function of indicating the magnitude of the expression evaluation value and another function.

2. The image-capturing apparatus according to claim 1, wherein the notification section comprises a plurality of light-emitting sections, the light-emitting surface of each of the light-emitting sections being oriented toward the image-captured person side, and indicates the magnitude of the expression evaluation value by changing the number of light-emitting sections emitting light.

3. The image-capturing apparatus according to claim 1, wherein the expression evaluation section has pre-stored therein information on a determination axis obtained by performing linear discriminant analysis based on a group of sample images of faces each corresponding to one of the specific expression and expressions other than the specific expression, and computes the expression evaluation value based on the magnitude of projection components of a vector based on an image signal of the face detected by the face detector with respect to a vector on the determination axis, the determination axis is computed based on data such that data of a vector based on the sample images is dimension-compressed by principal component analysis, and the expression evaluation section has pre-stored therein data of a vector in the determination axis as data of a vector having a dimension before being dimension-compressed, and computes the expression evaluation value by computing an inner product of the vector having a dimension before being dimension-compressed and a vector based on an image signal of the face detected by the face detector.

4. The image-capturing apparatus according to claim 1, wherein the notification section is configured to output notification information corresponding to the computed expression evaluation value to an image-captured person.

5. The image-capturing apparatus according to claim 1, wherein the lighting surface of the light-emitting section being oriented toward the image-captured person side, and displays the magnitude of the expression evaluation value as a change in the color of the light-emitting section, a change in the luminance thereof, or a change in the blinking speed thereof.

6. The image-capturing apparatus according to claim 5, further comprising:
a self-timer recording controller configured to perform control so that an image signal obtained by image capturing is coded and automatically recorded on a recording medium after a fixed period of time from when the depression of a shutter release button is detected; and
a self-timer light-emitting section configured to notify an image-captured person of the fact that the self-timer is being operated from when the shutter release button is depressed until when an image signal is recorded on the recording medium during control by the self-timer recording controller,
wherein the light-emitting section configured to indicate the magnitude of the expression evaluation value is also used for the self-timer light-emitting section.

7. The image-capturing apparatus according to claim 1, wherein the expression evaluation section has pre-stored therein information on a determination axis obtained by performing linear discriminant analysis based on a group of sample images of faces each corresponding to one of the specific expression and expressions other than the specific expression, and computes the expression evaluation value based on the magnitude of projection components of a vector based on an image signal of the face detected by the face detector with respect to a vector on the determination axis, the determination axis is computed based on data such that data of a vector based on the sample images is dimension-compressed by principal component analysis, and the expression evaluation section normalizes the image signal of the face detected by the face detector to an image size of the sample image used when the determination axis was determined, and computes the expression evaluation value using the image signal after the normalization.

8. The image-capturing apparatus according to claim 7, wherein the expression evaluation section performs, on the image signal after the normalization, a masking process for masking a signal in an image region that substantially does not exert an influence on expression determination, and computes the expression evaluation value by using the image signal after the masking process.

9. The image-capturing apparatus according to claim 1, wherein the notification section displays the notification information corresponding to the expression evaluation value, together with an image being captured, on a display apparatus, the display screen of the display apparatus being oriented toward the image-captured person side.

10. The image-capturing apparatus according to claim 9, wherein the notification section displays, as the notification information, a bar chart image indicating the magnitude of the expression evaluation value by using the length of a bar on the display apparatus.

11. The image-capturing apparatus according to claim 9, wherein the notification section displays, as the notification information, a frame around the face of an image-captured person displayed on the display apparatus, and changes at least one of the color, the brightness, and the line type of the frame according to the expression evaluation value.

12. The image-capturing apparatus according to claim 9, wherein the notification section displays, as the notification information, character information that differs in accordance with the magnitude of the expression evaluation value on the display apparatus.

13. The image-capturing apparatus according to claim 9, wherein, when the face detector detects a plurality of faces, the expression evaluation section computes the expression evaluation value for each of the detected faces, and the notification section displays the notification information corresponding to the expression evaluation value for each face in such a manner as to correspond to each of the faces of the image-captured persons.

* * * * *